United States Patent [19]

Janiszewski

[11] Patent Number: 5,704,443

[45] Date of Patent: Jan. 6, 1998

[54] DRIVE UNIT FOR MOTOR VEHICLES

[75] Inventor: Grzegorz Janiszewski, Angered, Sweden

[73] Assignee: AB Volvo, Gothenburg, Sweden

[21] Appl. No.: 421,213

[22] Filed: Mar. 13, 1995

[30] Foreign Application Priority Data

Mar. 11, 1994 [SE] Sweden .................. 9400843

[51] Int. Cl.$^6$ .................................. B60K 17/344
[52] U.S. Cl. ........................ 180/247; 475/202; 475/206
[58] Field of Search .................. 180/233, 244, 180/247–249; 475/203, 202, 204, 206

[56] References Cited

U.S. PATENT DOCUMENTS

| | | | |
|---|---|---|---|
| 4,476,952 | 10/1984 | Suzuki | 475/202 |
| 4,817,753 | 4/1989 | Hiketa | 475/206 |
| 4,875,698 | 10/1989 | Uchiyama | 475/206 |
| 5,188,574 | 2/1993 | Echigo et al. | 475/202 |

*Primary Examiner*—Anne Marie Boehler
*Attorney, Agent, or Firm*—Young & Thompson

[57] ABSTRACT

Drive for a four-wheel drive vehicle, comprising a transversely mounted in-line engine (1) and an automatic gearbox (8) placed parallel to the engine on one side thereof. The automatic gearbox has two output front wheel drive shafts (19,20) directed in opposite directions, and which are coupled to a differential (14–18) on the output side of the gearbox. One (19) of said drive shafts extends through the gearbox to its input side. Via a chain transmission (30) the differential gear carrier (14) drives an angle gear unit (36), which has an output shaft (39) connected to a propeller shaft (40) for the rear wheel differential (46).

5 Claims, 1 Drawing Sheet

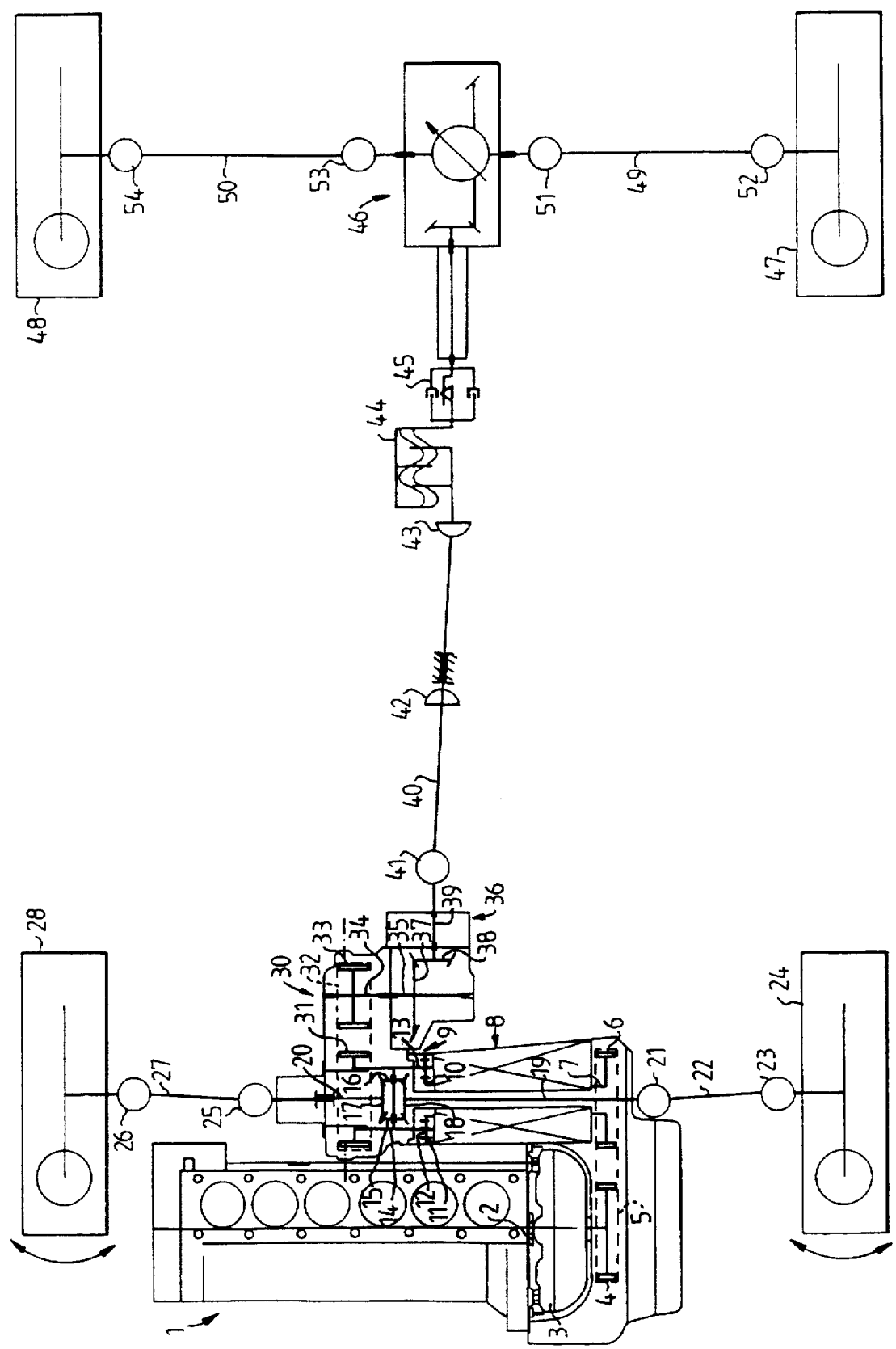

DRIVE UNIT FOR MOTOR VEHICLES

The present invention relates to a drive unit for motor vehicles, comprising an internal combustion engine having an engine block and designed to be mounted with its crankshaft transverse to the longitudinal axis of the vehicle, an automatic gearbox with a housing which is disposed beside the engine block and with its axis parallel to the axis of the crankshaft, and with an input drive element directed in the same direction as an output end of the crankshaft, and a transmission between a torque converter driven by the crankshaft and said input drive element, an output drive element in said gearbox housing driving a differential which drives in turn two output shafts, one of which is a shaft journalled concentrically with the input drive element and having its output end directed towards the input end of the gearbox housing.

Drive units of this type are known i.a. in which the engines are V-six engines. When mounted transversely such engines require a relatively large space in the longitudinal direction of the engine compartment due to the double rows of cylinders, which means that the longitudinal space remaining for the gearbox will be relatively limited. The dimensions of a gearbox are generally determined by the number of gear speeds and, in principle, it can be built in two different ways. In the first alternative a gearbox housing is short and wide. Such a gearbox is less suited for placement beside the engine than against the end of the engine. In the second alternative a longer and narrower gearbox housing is obtained and such a gearbox is obtained e.g. by placing the final drive of the gearbox and the differential in line with each other and by providing the gearbox with output shafts directed in opposite directions which are driven by the differential. One of said output shafts extends through the entire gearbox housing and out through its input side.

Thus, a long narrow gearbox placed beside the engine is particularly suited for use with transversely mounted V-engines due to the fact that it requires relatively little space in the longitudinal direction of the vehicle. Up to now it has been used primarily for this purpose even if it can also be used with advantage together with engines in engine compartments with relatively limited space at the end of the engine.

Starting from the drive unit described by way of introduction the purpose of the present invention is to achieve a drive unit for a four wheel drive vehicle.

This is achieved according to the invention by virtue of the fact that the engine is an in-line engine and that the output drive element of the gearbox is coupled via a supplemental transmission to an angle gear unit having an output shaft element designed to drive an additional drive axle.

The invention is based on the idea of exploiting the fact that an automatic gearbox placed to one side of the engine normally leaves extra space in the transverse direction in the engine compartment for an engine which is longer than the V-six engine having three cylinders in a row, e.g. an in-line engine with four or even six cylinders in a row. Using an inline engine reduces the total dimension of the drive unit in the longitudinal direction of the engine compartment as compared to a V-engine and it has been shown that the extra space thus obtained is sufficient to accommodate the increase in the total dimension of the drive unit in the longitudinal direction of the vehicle which results from the connecting the gearbox to the supplemental transmission and the angle gear unit.

In a preferred embodiment of the drive unit according to the invention, the engine has six cylinders. The supplemental transmission is a chain transmission and the angle gear unit is a hypoid gear train. It has been found that the chain transmission and the angle gear unit, when dimensioned and adapted to the length of a six cylinder engine will assume such a position in the engine compartment of the vehicle, that the output shaft of the angle gear unit will be located near the centre line of the vehicle so that a propeller shaft connected thereto can be placed in the tunnel which is also present in frontwheel drive vehicles for making the bottom plate more rigid. For a given torque a hypoid gear train can be dimensioned smaller than a common angle gear unit with bevel gears and, in combination with the lower placement of the propeller shaft, saves even more space.

The invention will be described in more detail with reference to examples shown in the accompanying drawing, where the FIGURE in principle shows an embodiment of a drive unit for driving the front and back wheels of a vehicle.

In the FIGURE, the numeral 1 generally designates an in-line six cylinder engine mounted transversely to the vehicle, the crankshaft 2 being coupled in a known manner to a torque converter 3, which, via a sprocket 4, a chain 5 and a sprocket 6, drives an input drive element 7 to a automatica gearbox generally designated 8, which can be of a type known per se and comprise a number of planetary gear steps (not shown in detail here) and a final drive 9 of planetary type. The final drive 9 comprises a driving sun gear 10, a stationary ting gear 11 and driven planet gears 12, the planet carrier 13, forming the output drive element of the gearbox, being coupled to a differential gear holder (differential housing) 14, the differential gears 15, 16 of which engaging differential gears 17 and 18 on two output shafts 19 and 20 with a common rotational axis. One shaft 19 is mounted concentrically with the input drive element 7 of the gearbox and is connected, on the input side of the gearbox housing, via a universal joint 21, to a wheel drive axle 22, which drives, via an additional universal joint 23, a steerable vehicle wheel 24. The other output shaft 20 is coupled in a corresponding manner via a universal joint 25 to the opposite output axle 27, which drives, via an additional universal joint 26, the other steerable wheel 28.

A supplementary transmission, generally designated 30, has a first sprocket 31 drivably coupled to the differential gear holder 14 and consequently also to the planet gear carrier 13 of the final drive. Via a chain 32, said sprocket 31 drives a second sprocket 33 on an output shaft 34 which is coupled to the input shaft 35 of an angle gear unit generally designated 36. A bevel gear 37 on the input shaft 35 engages a bevel gear 38 on the output shaft 39. The angle gear unit 36 is of hypoid type, which means small dimensions and a low placement of the output shaft 39, and consequently also low placement of the propeller shaft 40 which is coupled to the shaft 39 via a universal joint 41 and which, via two knuckle joints 42, 43 a visco clutch 44 and a one-way clutch 45, transmits torque to a differential 46 which drives two rear wheels 47, 48 via two drive axles 49, 50 with intervening universal joints 51, 52, 53 and 54.

I claim:

1. Drive unit for a motor vehicle, comprising an internal combustion engine (1), having an engine block, and designed to be mounted with its crankshaft transverse to the longitudinal axis of the vehicle, an automatic gearbox (8) with a housing, which is disposed beside the engine block and with its axis parallel to the axis of the crankshaft, and with an input drive element (7) directed in the same direction as an output end of the crankshaft, and a chain transmission (4–6) between a torque converter driven by the crankshaft and said input drive element, an output drive element (13) in said gearbox housing driving a differential (14-18) which drives in turn two output shafts (19,20), one of which is a shaft journalled concentrically with the input drive element and having its output end directed towards the input end of the gearbox housing, characterized in that the engine (1) is an in-line engine and that the output drive element (13) of the gearbox (8) is coupled via a supplementary chain transmission (30) to an angle gear unit (36) having an output shaft element (39) designed to drive an additional drive axle (49,50).

2. Drive unit according to claim 1, characterized in that the supplementary chain transmission (30) has an input drive element (31), which is joined to the differential side gear holder (14) of the differential.

3. Drive unit according to claim 1, characterized in that the angle gear unit (36) is a hypoid gear train.

4. Drive unit according to claim 1, characterized in that the engine (1) is a six-cylinder in-line engine.

5. Drive unit according to claim 1, characterized in that the output drive element of the gearbox is a planet gear holder (13) of a final drive (9) of the gearbox (8).

* * * * *